United States Patent [19]

Helwig, Jr.

[11] 4,156,432

[45] May 29, 1979

[54] DELAY CIRCUIT

[75] Inventor: William F. Helwig, Jr., Downers Grove, Ill.

[73] Assignee: Avtec Industries, Inc., Downers Grove, Ill.

[21] Appl. No.: 924,997

[22] Filed: Jul. 17, 1978

Related U.S. Application Data

[63] Continuation of Ser. No. 716,085, Aug. 20, 1976, abandoned.

[51] Int. Cl.[2] .............................................. F16K 31/02

[52] U.S. Cl. .................................... 137/551; 137/552; 137/624.11; 251/129; 340/652; 340/663; 431/78

[58] Field of Search ................ 251/129; 137/551, 552, 137/624.11; 340/248 B, 253 B, 253 C, 256; 431/78, 79, 80

[56] References Cited

U.S. PATENT DOCUMENTS

| | | | |
|---|---|---|---|
| 2,628,333 | 2/1953 | Maltby | 340/253 B |
| 2,691,705 | 10/1954 | Ray | 251/129 |
| 3,254,871 | 6/1966 | Limon | 251/129 |
| 3,441,929 | 4/1969 | Coffer | 340/256 |
| 3,619,724 | 11/1971 | Brown et al. | 251/129 |
| 3,619,768 | 11/1971 | Harte | 340/256 |
| 3,678,491 | 7/1972 | Day | 340/253 C |
| 3,906,294 | 9/1975 | Lourigan | 251/129 |
| 4,038,019 | 7/1977 | Matthews | 431/78 |

*Primary Examiner*—William R. Cline
*Assistant Examiner*—H. Jay Spiegel

[57] ABSTRACT

A delay circuit includes a switching element for operatively switching between a first position and a second position. The switching element connects an input voltage to an electrically-operated device in the first position. A delay element is operatively connected to the switching element for maintaining the switching element in the first position when an input voltage interruption occurs which is less than a pre-determined time interval.

6 Claims, 1 Drawing Figure

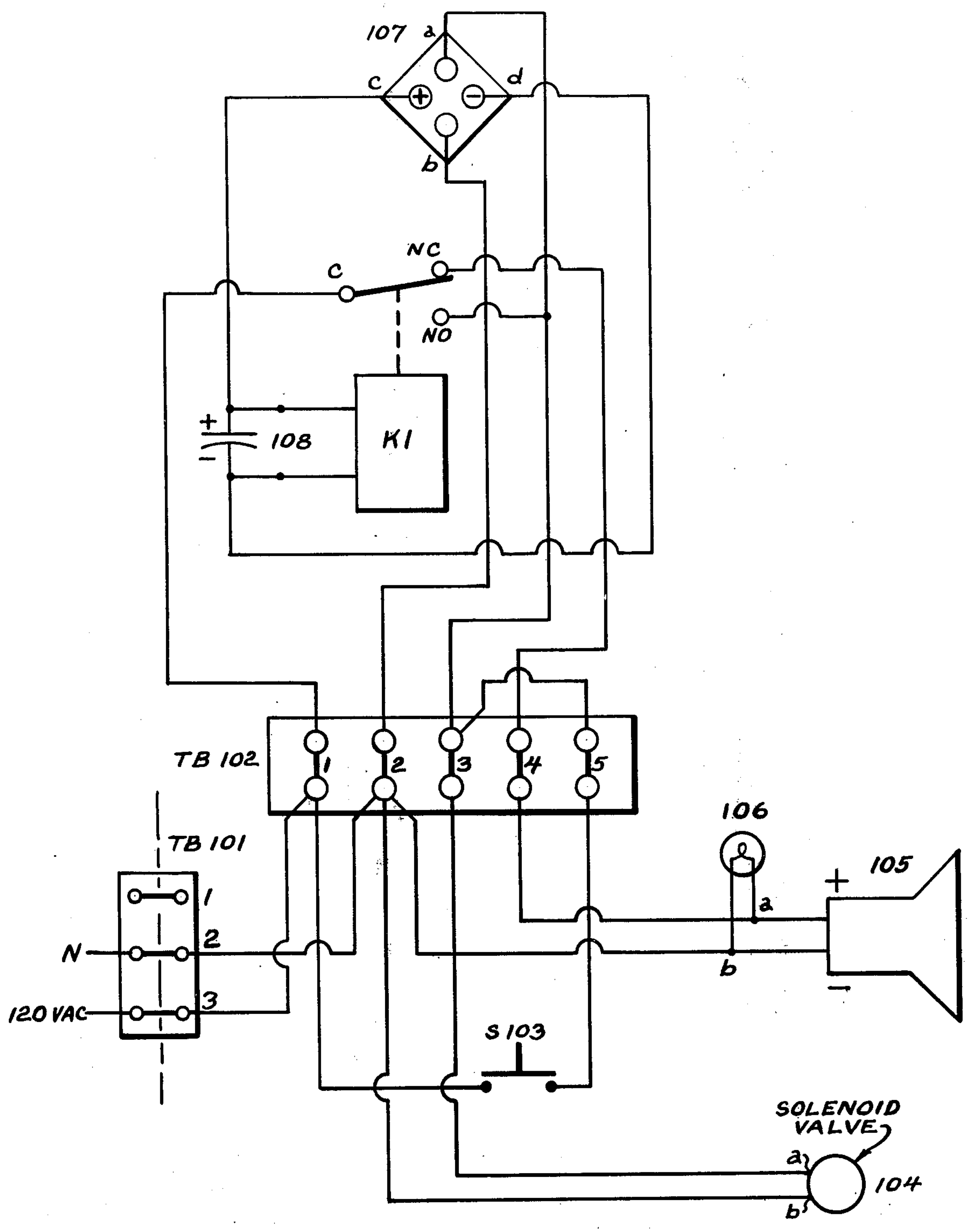
107
a
c
d
b
NC
C
NO
108
K1
TB 102
1
2
3
4
5
106
105
TB 101
1
N
2
120 VAC
3
a
b
S 103
SOLENOID
VALVE
a
b
104

DELAY CIRCUIT

This is a continuation, of application Ser. No. 716,085 filed Aug. 20, 1976, now abandoned.

BACKGROUND OF THE INVENTION

This invention relates generally to delay circuits and more particularly, it relates to a delay circuit utilized in conjunction with an electrically-operated device such as a gas solenoid valve for controlling the operation thereof. The delay circuit of this invention has particular application in industrial plants, manufacturing facilities, restaurants or any other facilities in which gas is utilized for operation of equipment.

Generally, it is known that in the operation of gas operated equipment such as burners, gas ovens and similar types of apparatus, an electrically-operated solenoid valve is frequently utilized for controlling the flow of gas in a main gas line to utilization points. If a plurality of gas-operated equipment is used, they commonly are coupled in series to the main gas line. One common problem encountered in the use of electrically-operated gas valves is that electrically power interruptions, even of the shortest interval, tend to interfere with the safe and convenient operation of the equipment. In such cases of a power failure such as a complete power loss or even a transient in the line voltage which only effects a momentary loss or drop in power, the electrically-operated solenoid valve connected conventionally upstream of the utilization points is caused to close and thus prevents further flow of gas to the individual burners or ovens. After closing of the valve, safety codes generally require that the gas line valve be manually reset. However, the requirement of manual reset for voltage fluctuations of short duration serves no practical purpose from a safety standpoint or otherwise. Complete or temporary power loss may be due to many circumstances such as disturbances on the line from the generating power source being overloaded, overloading by excess number of equipments being placed on the line internally, lightening, or fire and the like.

Regardless of the cause of the power interruption or fluctuation, the solenoid valve in a conventional control system will automatically close unitl a manually-operated reset switch or control device is activated. In many prior art control systems, the gas solenoid valve is closed and no indication of its interruption is known until an individual recognizes that no gas is being supplied to a utilization point. Often the interruption of the operation of the gas equipment may not be noticed for a considerable time after actual closing of the valve. This delay may cause disasterous effects on the cooking operation or other functions being performed by various equipment coupled to the main gas line causing delay, economic loss, and the creation of unsafe conditions. In order to restore the equipment back to normal operation after the power failure, it is necessary for an operator to reactivate each of the devices such as re-lighting each of the pilot lights of the burners and the like.

It should be apparent that it is extremely undesirable to require personnel to go through the laborous and time-consuming process of reactivating the equipment each time there is a mere transient in the line in which a momentary loss or drop in power is encountered in addition to the inherent disadvantages occurring because of the interruption of the operation of the equipment. It is, therefore, desirable to provide a delay circuit for automatically preventing the permanent closing or shutting of the gas solenoid valve when the power loss or fluctuation does not exceed a pre-determined time limit. In addition, it is advantageous to provide a device which will immediately and effectively warn operating personnel that the gas solenoid has been closed due to power interruptions greater than a predetermined interval.

SUMMARY OF THE INVENTION

Accordingly, it is an object of the present invention to provide a new and novel delay circuit which has all of the aforementioned features and yet overcomes each and every one of the above-discussed problems.

It is another object of the present invention to provide a delay circuit for automatically preventing the permanent closing or shutting of an electrically-operated device when duration of power loss or fluctuation is less than a predetermined interval.

It is another object of the present invention to provide a control circuit for a device providing visual and/or sound warning of a power loss or fluctuation.

In accordance with these aims and objectives, the present invention is concerned with the provision of a delay circuit for automatically preventing the permanent closure of an electrically-operated device such as a gas solenoid valve when the power interruption or fluctuation does not exceed a predetermined time period. During the short interval when the gas valve is closed upon a momentary power interruption, the volume of gas in the main gas line upstream of the utilization points is sufficient in most instances to maintain the gas-operated equipment in operation. The device of the invention is capable of automatically reopening the valve to supply gas to the utilization points after such voltage interruptions less than predetermined durations. Therefore, it can be seen that the necessity of manually reactivating the gas equipment such as by re-lighting pilots lights, burners and the like is completely alleviated when the power interruption is within a predetermined time interval.

However, once a power interruption does occur which exceeds a predetermined time interval, a sensory indication means is provided in the present invention to warn personnel in the vicinity of the utilization points that the gas valve has been closed due to a power interruption which is greater than a predetermined interval. Thus, the personnel can take immediate action in checking the gas equipment for re-activation, if necessary, as soon as possible to insure that detrimental interruption of the operation of the equipment does not occur.

BRIEF DESCRIPTION OF THE DRAWINGS

These and other objects and advantages of the present invention will become more fully apparent from the following detailed description when read in conjunction with the appending drawing in which there is shown an electrical schematic diagram of one embodiment of the delay circuit of the instant invention.

DETAILED DESCRIPTION OF THE PREFERRED EMBODIMENT

For convenience of illustration, the present invention is described in conjunction with electrically-operated gas solenoid valves but the use of device of the invention is not intended to be so limited. The present invention has numerous possible applications in other fields since the invention pertains to a delay circuit for either automatically preventing the permanent closure of an electrically-operated device and providing a convenient and effective warning system.

Referring now in detail to the drawing of the particular illustration, there is shown an embodiment of the circuit of the present invention. The input power of alternating current to the delay circuit is provided by a suitable source adapted to be coupled to the left side or external side of a terminal block TB 101. The "hot side" of the line input power such as from a 120 volt source shown as 120 VAC is applied to the terminal block TB 101-3 while a neutral input line is coupled to the terminal block TB 101-2. It should be noted that the 120 VAC line is generally connected through a fire control device such as a switch or circuit breaker (not shown) and/or any other type of suitable external equipment, which is activated upon a short-circuit or a fire as a circuit breaker between the input source and input connection to the instant circuit.

The other side or right side of the terminal block TB 101-2 is connected to a terminal block TB 102 at terminal 2 while the terminal block TB 101-3 is connected to the terminal block TB 102 at terminal 1. The lower side of the terminal block TB 102-1 is electrically coupled to one side of a conventional manual reset switch S 103 for reasons to be explained in detail later. Switch S 103 includes an additional contact which is connected to the lower side of the terminal block TB 102-5. The upper side of the terminal block TB-102-1 is connected to the wiper or arm C of a relay K1.

The lower side of the terminal block TB 102-2 is further coupled to one side 104*b* (neutral) of an electrically-operated gas solenoid valve 104 which controls the flow of gas through a main gas line (not shown) to gas-operated equipment situated downstream of the valve. In addition, this terminal in connected to side 106*b*, 105*b* (neutral) of a suitable alarm system such as horn 105 and a light source 106. The upper side of the terminal block TB 102-2 is connected to one input side 107*b* (neutral) of a full wave rectification bridge 107.

The upper side of the terminal block TB 102-3 is connected to the other input side 107*a* (120 VAC) of the rectification bridge 107 and to the normally opened contact NO of the relay K1. The lower side of the terminal block TB 102-3 is attached to the other side 104*a* of the solenoid valve 104. The lower side of the terminal block TB 102-4 is electrically connected to the other side 105*a* and 106*a* of the horn 105 and the light source 106. The terminal block TB 102-4 on its upper side is connected to the normally closed contact NC of the relay K1. The upper side of the terminal block TB 102-5 is connected to the upper side of the terminal block TB 102-3.

The load side of the rectification bridge 107 is connected across capacitor 108 which is coupled in parallel with the coil of the relay K1. The positive output terminal 107*c* of the bridge is connected to the positive side of capacitor 108 whereas the negative voltage output terminal 107*d* of the bridge is interconnected with the negative side of the capacitor 108.

In normal operation, there is applied a 120 VAC line voltage across terminals 2 and 3 of the terminal block TB 101. The relay K1 will be energized and the arm C of the relay K1 will be in contact with the normally opened contact NO. Thus, the 120 VAC line voltage on TB 101-3 will be able to pass through to the normally opened relay contact NO to the "hot" side 104*a* of the electrically-operated gas solenoid valve 104 connected to TB 102-3. Consequently, the valve 104 connected generally at the inlet of the main gas line will be opened thereby allowing gas to flow downstream of the line to gas operated equipment such as gas stoves, ovens and the like utilized in manufacturing facilities, industrial plants, food preparation facilities, restaurants and the like. These gas-operated devices are conventionally provided with gas consuming elements which control the operation thereof.

When there is a power failure, momentary fluctuation or surge, the capacitor 108 which has been previously fully charged will begin to discharge through the coil of the relay K1. However, the relay will remain energized and connection between the arm C and the normally opened contact NO will be maintained until the capacitor is completely discharged. Consequently, if sufficient power is again restored before the capacitor 108 has completely discharged, the solenoid valve 104 will be activated or opened again allowing normal operation to resume.

On the other hand, if there is a power failure, momentary fluctuation or surge which exceeds a pre-selected time interval (such as the time needed to fully discharge the capacitor), the capacitor 108 which has been previously fully charged will become completely discharged through the coil of the relay K1. The amount of time that it takes for the capacitor 108 to be completely discharged will be dependent upon the voltage-rating of the capacitor employed in the circuit. The capacitor 108 can be selected to give any desired amount of discharge time. Although not intended to be so limited, capacitor 108 may possess a substantial total discharge in approximately six seconds. However, any other capacitor providing other discharge times may be used in conjunction with the invention depending on desired results. Once the capacitor has discharged completely, the relay K1 will be de-energized and the relay contact will return to its normally closed position (NC). This will, in turn, cause disconnection of the "hot" side 104*a* of the solenoid valve 104 from the 120 VAC line on TB 101-3. Consequently, the solenoid valve 104 will remain closed and prevent further flow of the gas in the line to the gas utilization points.

Assuming that the power is again being applied to terminals 2 and 3 of TB 101 the reset switch S 103 must be manually depressed which will supply current from the 120 VAC line on TB 101-3 to the terminal 107*a* on the bridge as the initial step to restore operation of the equipment to normal operation. The output of the bridge 107 will then recharge the capacitor 108 to re-energize the relay K1. Also, the 120 VAC line on TB 101-3 will be able to be directed through the normally opened contact of the relay K1 to the terminal 104*a* of the solenoid valve 104. Thus, the solenoid valve 104 will be re-activated to an open position to allow gas through the gas line to the gas-operated equipment. Since the flow of gas has resumed, the equipment can be re-activated for its normal operation.

Since it is a very costly and time-consuming process to require an operator to re-light all of the ovens, stoves and the like each time there is a power failure or fluctuation, it would be undesirable to make necessary such a re-lighting process when the power loss is only due to a transient in the line voltage which lasts only a very few seconds or less. Accordingly, when the power loss in this preferred embodiment is less than approximately six seconds as determined by the capacitor 108, the relay K1 will not become de-energized, and thus, once power is restored, the 120 VAC line will be able to supply current through the normally opened contact NO of the relay K1 to re-activate the solenoid valve 104 to resume the supply of gas to the equipment. Under most circumstances the volume of gas in the line downstream of the momentarily closed valve will be sufficient to continue the operation of the equipment during such brief power interruptions.

However, when the power loss does exceed the selected limit and is then subsequently restored, the horn 105 will be activated and the light will visually indicate that a prior power interruption has occurred and that the valve 104 will not automatically re-open even when the power has resumed. Since the relay K1 will be de-energized, the 120 VAC line will pass through the normally closed contact NC of the relay K1 to supply current to the "hot" side 105*a* and 106*a* of the horn and the light. Of course, when the reset switch S 103 is depressed to re-activate the solenoid valve 104, this will de-activate the horn and light as the 120 VAC line on TB 101-3 will be switched from the normally closed contact to the normally opened contact of the relay K1 thereby removing current from the "hot" side 105*a* and 106*a*.

From the foregoing description of the delay circuit embodying the present invention, it can be seen that there is provided an improved delay circuit which automatically prevents the permanent closure of an electrically-operated device because of momentary fluctuations of input power of less than a predetermined time interval. Further, a visual and sound sensory alarm system is provided to indicate a prior power failure which exceeds a predetermined time period.

While there has been illustrated and described what is at present to be a preferred embodiment of the present invention, it will be understood by those skilled in the art that various changes and modifications may be made, the equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiment disclosed as a best mode contemplated for carrying out this invention, but that the invention will include all embodiments falling within the scope of the appended claims.

What is claimed is:

1. A delay circuit for automatically preventing the permanent closure of a fluid solenoid valve positioned in a fluid line in the event of a momentary loss or drop in input voltage of less than a predetermined time interval and for manually restoring operation of the solenoid valve subsequent to an input voltage interruption which exceeds the predetermined time interval, said circuit comprising:

switching means including a relay and a switch contact, said relay maintaining said switch contact in a first position when the input voltage interruption occurs which is less than the predetermined time interval and moving said switch contact to a second position when the input voltage interruption occurs which is greater than the predetermined time interval;

delay means operatively coupled to the relay of said switching means for maintaining said switch contact in said first position when the input voltage interruption occurs which is less than the predetermined time interval;

a fluid solenoid valve being operatively coupled to the input voltage when the switch contact is in said first position to maintain said valve open to permit the flow through the fluid line, said fluid valve being disconnected from the input voltage when the switch contact is in the said second position to close said fluid valve and discontinue flow in the fluid line; and a manually resettable switch operatively connected to said first position of said switch contact, said resettable switch being required to be actuated to supply the input voltage to said relay subsequent to the input voltage interruption which exceeded said predetermined time interval and to restoration of the input voltage for transferring said switch contact from said second position back to said first position to reopen said valve to permit flow through the fluid line.

2. The delay circuit as claimed in claim 1, wherein said delay means includes a capacitor coupled to said relay, said capacitor being fully charged in normal operation to maintain said relay energized and said switch contact in said first position, said capacitor discharging completely when the input voltage interruption occurs which is greater than said predetermined time interval thus moving said switch contact from said first position to said second position.

3. The delay circuit as claimed in claim 2, further comprising warning indication means operatively connected to said switch contact in said second position for indicating an input voltage interruption has occurred which exceeds said pre-determined time interval once the input voltage has been restored.

4. The delay circuit as claimed in claim 3, wherein said warning indication means includes an audio means.

5. The delay circuit as claimed in claim 4, wherein said indication means includes a light means.

6. The delay circuit as claimed in claim 4, wherein said warning indication means includes an audio means and a light means to provide both audio and visual indications.

* * * * *